(12) United States Patent
Stone et al.

(10) Patent No.: US 9,886,434 B2
(45) Date of Patent: Feb. 6, 2018

(54) METHOD AND APPARATUS FOR ACQUIRING PROGRAM INFORMATION

(75) Inventors: Christopher Stone, Newtown, PA (US); Patrick Leary, Horsham, PA (US)

(73) Assignee: GOOGLE TECHNOLOGY HOLDINGS LLC, Mountain View, CA (US)

( * ) Notice: Subject to any disclaimer, the term of this patent is extended or adjusted under 35 U.S.C. 154(b) by 652 days.

(21) Appl. No.: 11/969,036

(22) Filed: Jan. 3, 2008

(65) Prior Publication Data
US 2009/0178100 A1    Jul. 9, 2009

(51) Int. Cl.
| | |
|---|---|
| G06F 3/00 | (2006.01) |
| G06F 13/00 | (2006.01) |
| H04N 5/445 | (2011.01) |
| H04N 7/16 | (2011.01) |
| G06F 17/30 | (2006.01) |
| H04N 21/41 | (2011.01) |
| H04N 21/4147 | (2011.01) |
| H04N 21/434 | (2011.01) |
| H04N 21/658 | (2011.01) |
| H04N 21/84 | (2011.01) |

(52) U.S. Cl.
CPC .......... *G06F 17/30* (2013.01); *H04N 21/4104* (2013.01); *H04N 21/4147* (2013.01); *H04N 21/4345* (2013.01); *H04N 21/6581* (2013.01); *H04N 21/84* (2013.01)

(58) Field of Classification Search
CPC .......... H04N 21/4104; H04N 21/4147; H04N 21/4345; H04N 21/6581; H04N 21/84
See application file for complete search history.

(56) References Cited

U.S. PATENT DOCUMENTS

| | | | |
|---|---|---|---|
| 6,263,503 B1* | 7/2001 | Margulis | ........................ 725/81 |
| 2002/0035616 A1 | 3/2002 | Diamond et al. | |
| 2002/0100063 A1 | 7/2002 | Herigstad et al. | |
| 2003/0135860 A1* | 7/2003 | Dureau | ........................ 725/109 |

(Continued)

FOREIGN PATENT DOCUMENTS

| | | |
|---|---|---|
| WO | 01/099421 A1 | 12/2001 |
| WO | 03/085965 A1 | 10/2003 |
| WO | 2003/088671 A1 | 10/2003 |

OTHER PUBLICATIONS

PCT International Search Report, Re: PCT Application #PCT/US08/87891 dated Dec. 22, 2008.

(Continued)

*Primary Examiner* — Kyu Chae
(74) *Attorney, Agent, or Firm* — Lowenstein Sandler LLP (57) ABSTRACT

A process receives content from a recording device. The content is provided through a transmission from a distribution system to the recording device and recorded by the recording device on a storage medium associated with the recording device. Further, the process receives, from the recording device, transmission data corresponding to the recorded content. The transmission data indicates one or more transmission identifiers that identify the transmission. In addition, the process sends the transmission data to a server. Finally, the process receives, from the server, program data that is descriptive of the content.

20 Claims, 5 Drawing Sheets

(56) References Cited

U.S. PATENT DOCUMENTS

| | | | |
|---|---|---|---|
| 2003/0149988 A1* | 8/2003 | Ellis | H04N 5/44543 |
| | | | 725/87 |
| 2004/0031053 A1* | 2/2004 | Lim et al. | 725/86 |
| 2004/0158855 A1* | 8/2004 | Gu et al. | 725/61 |
| 2004/0214556 A1* | 10/2004 | Yamada | 455/414.3 |
| 2005/0166228 A1* | 7/2005 | Takatori | H04N 21/4312 |
| | | | 725/39 |
| 2005/0278375 A1* | 12/2005 | Mitchko | G06F 17/30817 |
| 2006/0218620 A1* | 9/2006 | Nadarajah et al. | 725/151 |
| 2007/0061487 A1 | 3/2007 | Moore et al. | |
| 2007/0064712 A1 | 3/2007 | Lee et al. | |
| 2007/0154169 A1* | 7/2007 | Cordray et al. | 386/83 |
| 2007/0157260 A1* | 7/2007 | Walker | 725/86 |
| 2007/0199037 A1* | 8/2007 | Matsuzaki | H04N 21/44008 |
| | | | 725/115 |
| 2008/0046935 A1* | 2/2008 | Krakirian | 725/39 |
| 2008/0092177 A1* | 4/2008 | Swanburg | H04N 21/41407 |
| | | | 725/62 |
| 2008/0263621 A1* | 10/2008 | Austerlitz et al. | 725/139 |
| 2008/0301741 A1* | 12/2008 | Stern et al. | 725/93 |

OTHER PUBLICATIONS

Supplementary European Search Report issued in European Patent Application No. EP 08 86 8088, dated Mar. 29, 2012.

\* cited by examiner

METHOD AND APPARATUS FOR ACQUIRING PROGRAM INFORMATION

BACKGROUND

1. Field

This disclosure generally relates to the field of audio/visual content. More particularly, the disclosure relates to data associated with recording of audio/visual content.

2. General Background

A variety of devices currently allow for the recording of audio/visual content. For instance, a set-top box ("STB") may allow for the acquisition of content (e.g., tuning to a Radio Frequency Quadrature Amplitude Modulation ("RF QAM") carrier delivering audio/video services) from a service provider and the recording of the content on a storage medium (e.g., hard disk drive) associated with the STB. In order to record the content, the STB often has to have a third-party software application that initiates the recording. Further, information associated with the recording content is often recorded with the audio/video of the program in a proprietary manner such that only the application itself may decode the recorded information. Examples of such information include program title/name, description of the program, etc.

Developments have allowed the transferring of data from a STB to a peripheral device so that a user may view/listen to the recorded content on the peripheral device. The recorded content may be transferred from the STB to the peripheral device without the aid of the application that managed the recording of said content. When transferring content to a peripheral device without the aid of the application that managed the recorded content, the recording device simply copies/moves data blocks that constitute the recorded content to the peripheral device. However, the information corresponding to the recording content is not sent with the recorded content. As a result, the peripheral device has the audio/video packets needed to decode and playback the copied/moved recorded content. However, the information that describes the recorded content is not available for display to the viewer. For instance, an electronic programming guide ("EPG") does not have descriptive information of the recorded content that facilitates selection of content by the user.

SUMMARY

In one aspect of the disclosure, a process is provided. The process receives content from a recording device. The content is provided through a transmission from a distribution system to the recording device and recorded by the recording device on a storage medium associated with the recording device. Further, the process receives, from the recording device, transmission data corresponding to the recorded content. The transmission data indicates one or more transmission identifiers that identify the transmission. In addition, the process sends the transmission data to a server. Finally, the process receives, from the server, program data that is descriptive of the content.

In another aspect of the disclosure, a computer program product is provided. The computer program product comprises a computer useable medium having a computer readable program. When executed on a computer, the computer readable program causes the computer to receive content from a recording device. The content is provided through a transmission from a distribution system to the recording device and recorded by the recording device on a storage medium associated with the recording device. Further, the computer is caused to receive, from the recording device, transmission data corresponding to the recorded content. The transmission data indicates one or more transmission identifiers that identify the transmission. In addition, the computer is caused to send the transmission data to a server. Finally, the computer is caused to receive, from the server, program data that is descriptive of the content.

In yet another aspect of the disclosure, a peripheral device includes a content reception module that receives content from a recording device. The content is provided through a transmission from a distribution system to the recording device and recorded by the recording device on a storage medium associated with the recording device. Further, the peripheral device receives transmission data corresponding to the recorded content from the recording device, the transmission data indicating one or more transmission identifiers that identify the transmission. In addition, the peripheral device includes a transmission data query module that sends the transmission data to a server. Finally, the peripheral device includes a program data reception module that receives, from the server, program data that is descriptive of the content.

BRIEF DESCRIPTION OF THE DRAWINGS

The above-mentioned features of the present disclosure will become more apparent with reference to the following description taken in conjunction with the accompanying drawings wherein like reference numerals denote like elements and in which.

DETAILED DESCRIPTION

A method and apparatus are disclosed that acquire program information. The program information may correspond to recorded audio/video content that is recorded in a proprietary manner. Further, the audio/video content may be copied/moved from a recording device to a peripheral device. The recording device may be a set top box ("STB"), digital video recorder ("DVR"), or any other device that is capable of recording audio/video content. Further, the peripheral device may be a portable media player ("PMP"), mp3 player, or any other device that is capable of communicating with the recording device so that the audio/video content is copied/moved to the peripheral device.

In one embodiment, the peripheral device is operably connected to the recording device to receive the recorded audio/video content. For example, the peripheral device may be connected to the recording device via a cable. In another embodiment, the peripheral device may communicate wirelessly with the recording device. For example, infrared communication may be utilized.

The recording device retains additional information that is not directly assigned to the content by the content owner/originator and not acquired from a third-party application. For example, the recording device retains information associated with the tuning/acquisition of the content. Examples of such information include frequency, modulation mode, program identifier ("PID"), virtual channel map identifier ("ID"), source ID, source name, time stamp, etc. The recording device then sends this data associated with a recording to a service provider. When the recorded content is copied/moved from the recording device to a peripheral device, the peripheral device communicates with an external device to request the data associated with the recorded content. In one embodiment, the peripheral device connects to the service provider's web site to make this request. Further, the service provider can then provide the peripheral device with the data associated with the recorded content. In another embodiment, the peripheral device connects to some third party device to request data related to the recorded content. In other words, the server used to retrieve program data by the portable device can be the same or optionally a different server than the one used to obtain the program data by the application in the recording device.

To provide such a configuration, the recording device retains information available to the lower level firmware, i.e., information that is not dependent on and/or obtained from a third-party application. Accordingly, the peripheral device that copies/moves the content may be able to perform a look up of the content information based on the data retained by the lower level firmware. As an example, cable plant specific data, e.g. channel map info, tuning info, etc., may be utilized to derive detailed information about content transmitted on the cable plant.

Figure 1:
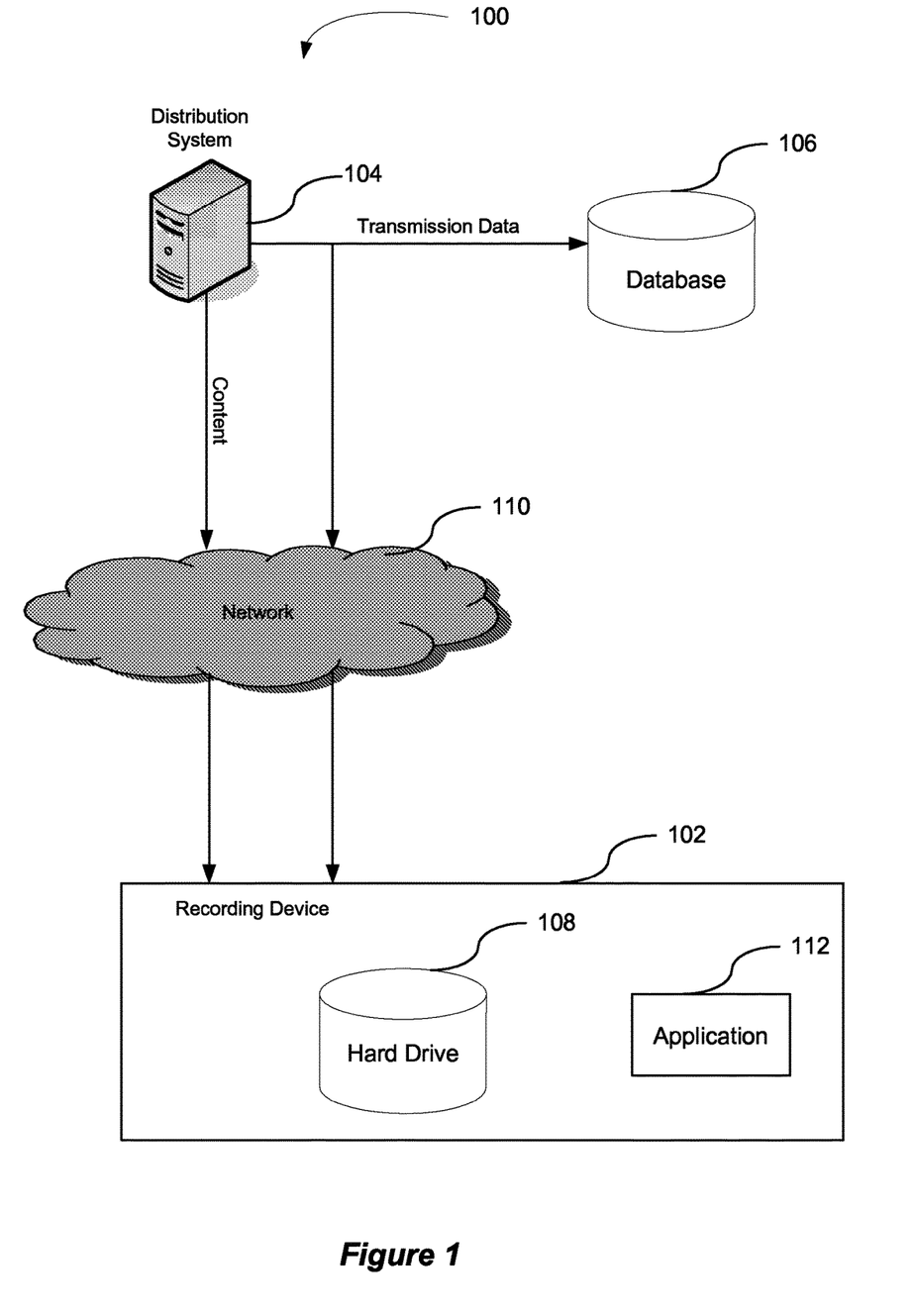
FIG. 1 illustrates a configuration that may be utilized by a recording device to record content.

FIG. 1 illustrates a configuration 100 that may be utilized by a recording device 102 to record content. A distribution system 104 provides the content to the recording device 102 through a network 110. In one embodiment, the distribution system 104 is an audio/video distribution system. For example, the distribution system 104 may be a streaming audio/video server. The network 110 may be a Hybrid Fiber-Coax ("HFC") network, fiber network, wireless network, etc. In one embodiment the distribution system 104 communicates with a conditional access system to encrypt the content.

Further, the distribution system 104 stores transmission data regarding the transmission of the content to the recording device 102. The transmission data includes one or more transmission identifiers that can identify the particular transmission. For example, the one or more transmission identifiers may include a frequency, a modulation mode, a program identifier, a virtual channel map identifier, a source identifier, a source name, a time stamp, an Internet Protocol ("IP") source address, an IP destination address, a User Datagram Protocol ("UDP") source port, a UDP destination port, a Transmission Control Protocol ("TCP") source port, a TCP destination port, and/or any combination of the above-listed transmission identifiers. In one embodiment, the distribution system 104 stores the transmission data in database 106 so that a query may be later performed to find the transmission data for particular content that was provided to the distribution system 104.

The recording device 102 receives the content data, program data, and transmission data from the distribution system 104. In one embodiment, the recording device 102 has a tuner, demodulator, and/or demultiplexor to facilitate receiving the content. Further, the recording device 102 records both the content and the transmission data on to a storage medium 108, e.g., a hard drive. In one embodiment, the recording device 102 may have one or more keys that provide cryptographic access to the content. In addition, an application 112 that initiates the recording utilizes a proprietary encoding/decoding mechanism to encode/decode the program metadata. The recording device 102 associates the content data with the program metadata so that the recording device can provide playback of the content and display the corresponding program information. For example, for a first recording, the recording device 102 associates first content information, e.g., the corresponding cryptographic key for the first content data, with the first program information managed by the application 112. For a second recording, the recording device 102 associates second content information, e.g., the corresponding cryptographic key for the second content data, with the second program information managed by the application 112. In one embodiment, the first recording and the second recording are different programs. In another embodiment, the first recording and the second recording are for different sets of data of the same program.

Accordingly, the application 112 displays the program information corresponding to particular content when requested by the user. For example, the program information may provide information through various menus to allow the user to make a selection of content.

Figure 2:
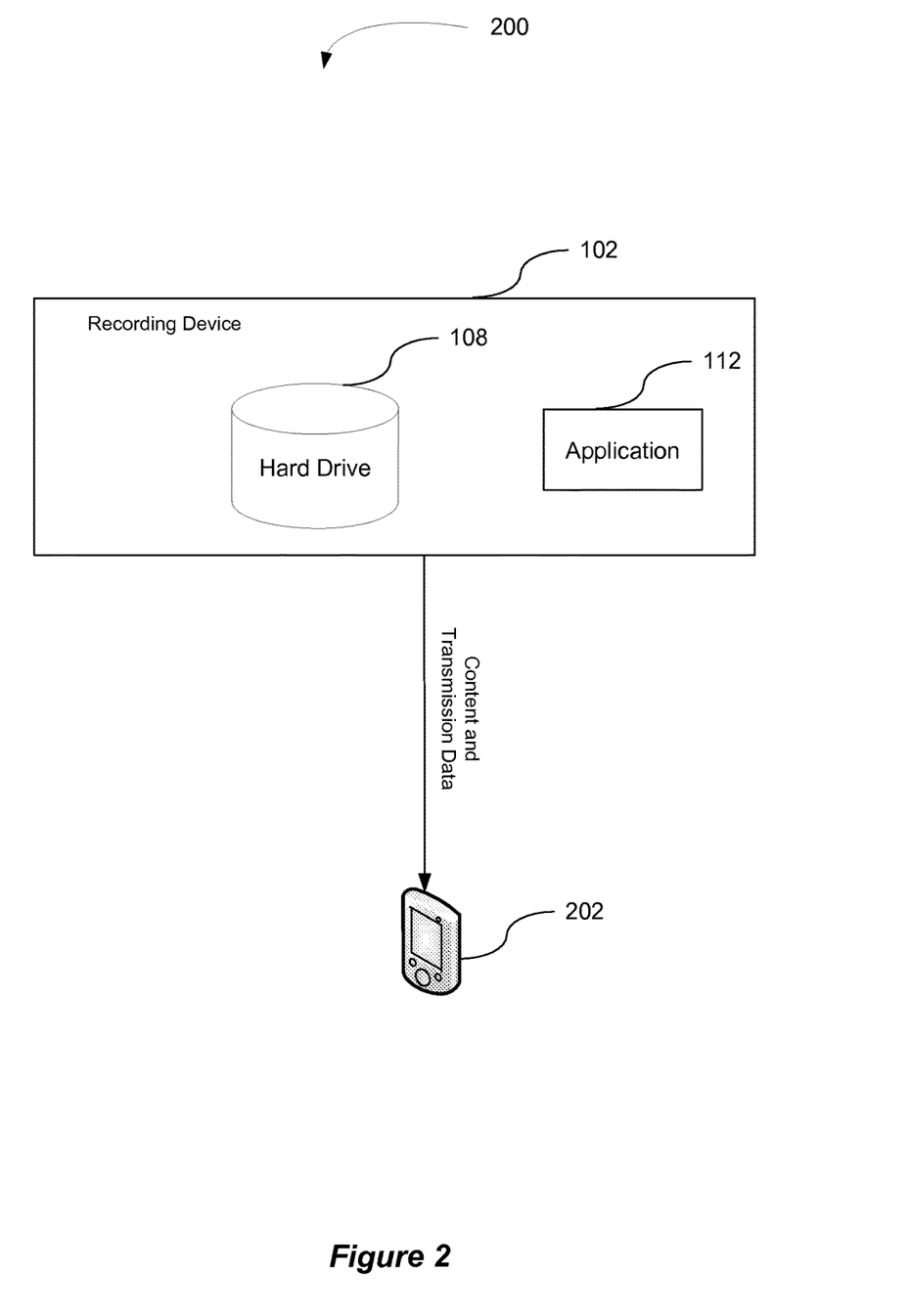
FIG. 2 illustrates a configuration that may be utilized by a peripheral device to obtain the content from the recording device.

FIG. 2 illustrates a configuration 200 that may be utilized by a peripheral device 202 to obtain the content from the recording device 102. At some point, the user may want to move/copy the recorded content from the recording device 102 to the peripheral device 202. Accordingly, the peripheral device 202 communicates, e.g., through a cable connection, with the recording device 102. An example of a cable connection is a digital interface such as Universal Serial Bus ("USB"). The recorded content and the transmission information are provided from the recording device 102 to the peripheral device 202.

Figure 3:
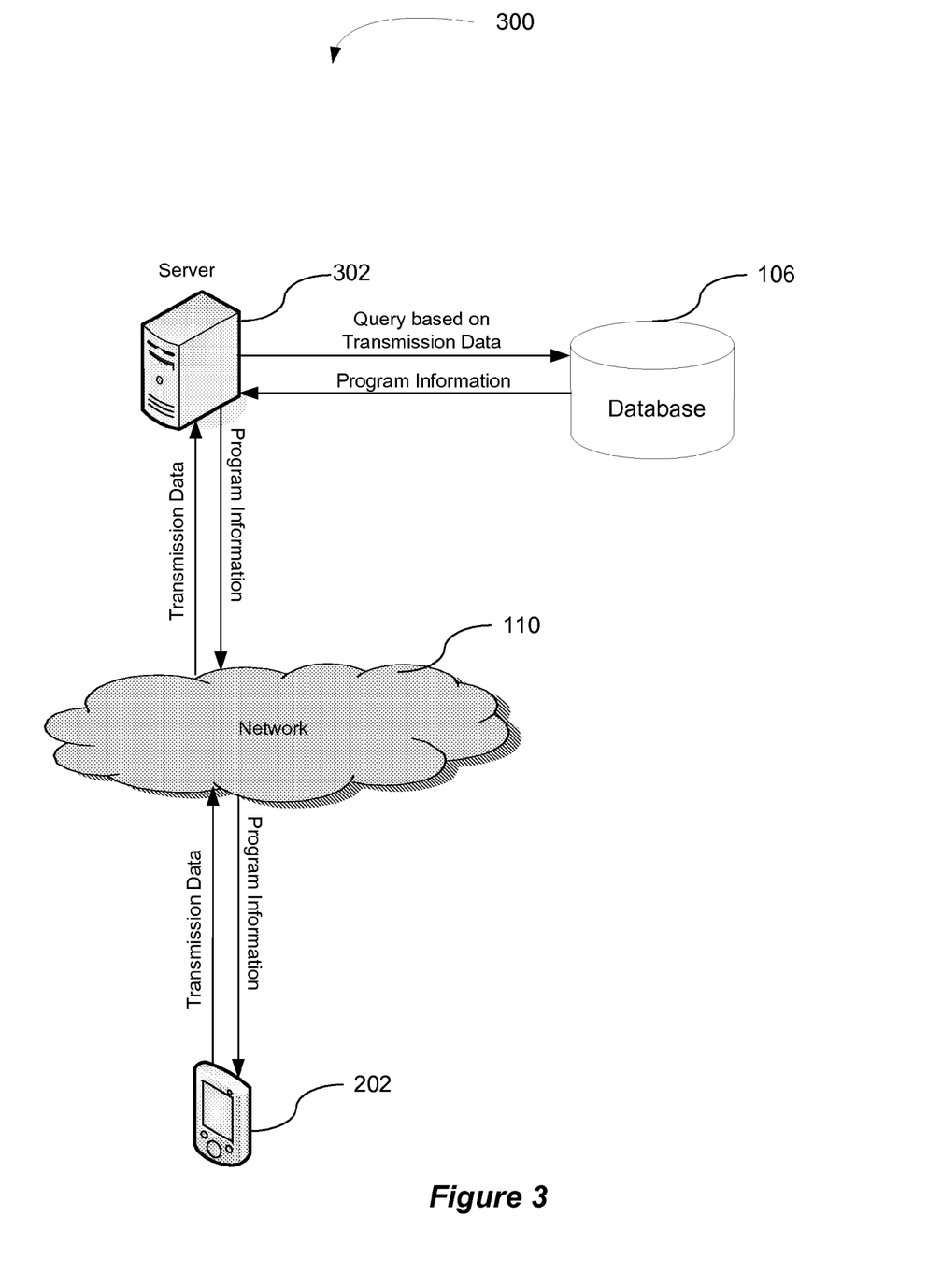
FIG. 3 illustrates a configuration that may be utilized by the peripheral device to determine the program information corresponding to the recorded content obtained from the recording device.

FIG. 3 illustrates a configuration 300 that may be utilized by the peripheral device 202 to determine the program information corresponding to the recorded content obtained from the recording device 102. The peripheral device 202 utilizes the transmission data received from the recording device 102 to determine the program information. As a result, the application 112 does not need to be involved in the copy/move of the recorded content from the recording device 102 to the peripheral device 202.

The peripheral device 202 may autonomously attempt to determine the program information. Alternatively, the peripheral device 202 may wait for a user interaction to attempt to determine the program information.

To determine the program information, the peripheral device 202 connects to the network 110 that is connected to a server 302. For example, the network may be connected to the server 302 by being connected to a service provider's distribution system that includes the server 302. In one embodiment, the server 302 is part of the same distribution system 104, as shown in FIG. 1, that provided the content. In another embodiment, the server 302 is distinct from the distribution system 104, but has access to the program information corresponding to the content.

In one embodiment, the peripheral device 202 operably communicates with a computing device, e.g., through a cable connection or infrared communication, to connect to the network 110 through a web site. For example, the user may utilize a personal computer ("PC") that is connected to a DOCSIS modem or directly to the DOCSIS modem via a wireless connection such as 802.11.

Accordingly, the peripheral device 202 then initiates communication with the server 302. Once communication is established, the peripheral device 202 may provide the transmission data to the server 302. Accordingly, the server 302 can then query the database 106 to determine the program information for the particular recording that that was sent during the transmission for the recording.

As an example, the peripheral device 202 may provide record start/stop time, tuned frequency, virtual channel, and source ID. The server 106 would look in its database 106 for a program that was transmitted/broadcast during the provided time, and was assigned the particular virtual channel and source ID. If a match is found, then the server 302 transmits the program data to the peripheral device 202. The peripheral device 202 stores the program data locally for use with the graphical user interface ("GUI") presentation of the content. Accordingly, the peripheral device 202 may associate the transmission data with program information for each recording. For instance, the transmission data for the first recording may be associated with the program information for the first recording. Further, the transmission data for the second recording may be associated with the program information for the second recording.

Figure 4:
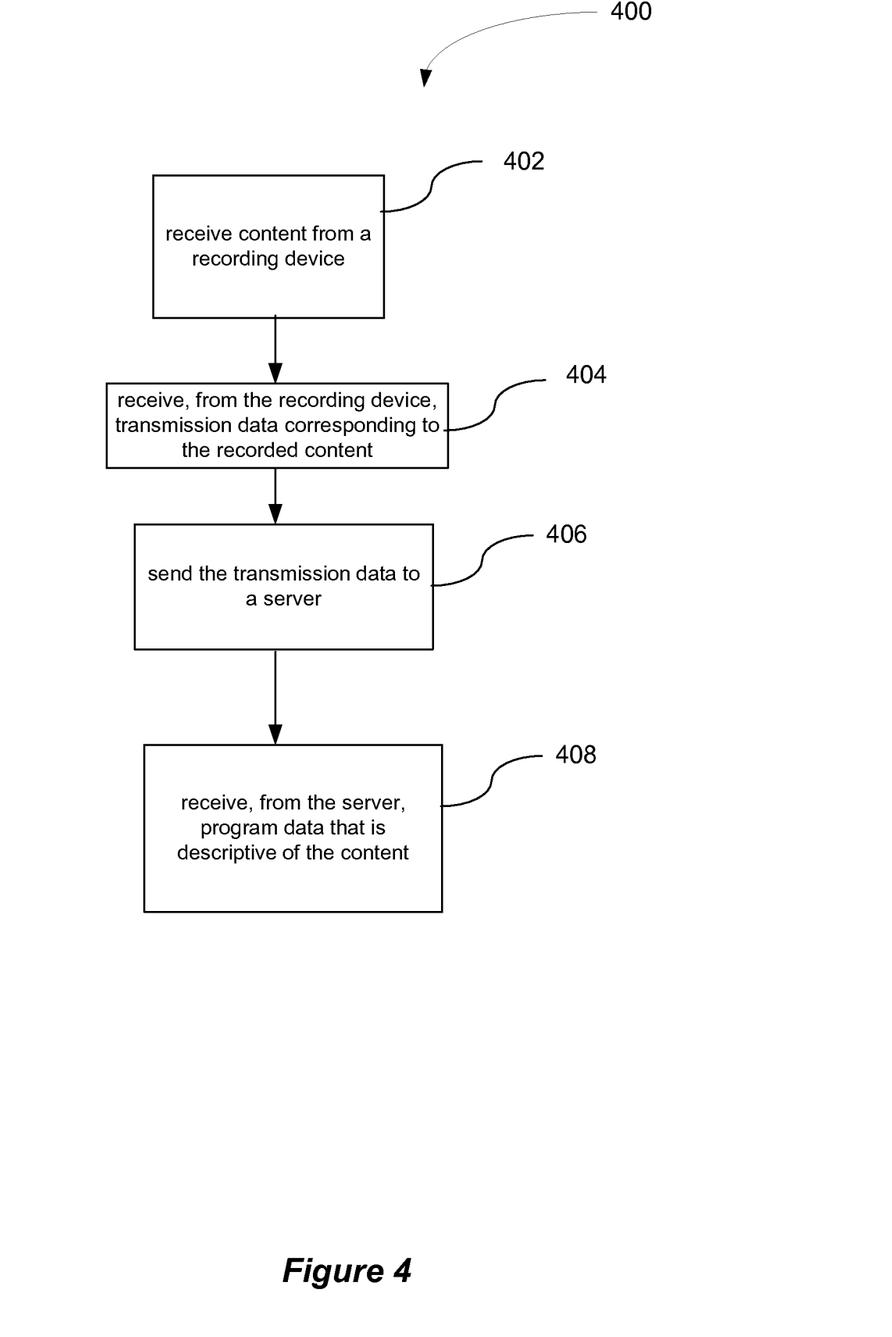
FIG. 4 illustrates a process that may be utilized to acquire program information.

FIG. 4 illustrates a process 400 that may be utilized to acquire program information. At a process block 402, the process 400 receives content from a recording device. The content is provided through a transmission from a server to the recording device and recorded by the recording device on a storage medium associated with the recording device. Further, at a process block 404, the process 400 receives, from the recording device, transmission data corresponding to the recorded content. The transmission data indicates one or more transmission identifiers that identify the transmission. In addition, at a process block 406, the process 400 sends the transmission data to a server. Finally, at a process block 408, the process 400 receives, from the server, program data that is descriptive of the content.

The process 400 shown in FIG. 4 may be implemented in a general, multi-purpose or single purpose processor. Such a processor will execute instructions, either at the assembly, compiled or machine-level, to perform that process. Those instructions can be written by one of ordinary skill in the art following the description of FIG. 4 and stored or transmitted on a computer readable medium. The instructions may also be created using source code or any other known computer-aided design tool. A computer readable medium may be any medium capable of carrying those instructions and include a CD-ROM, DVD, magnetic or other optical disc, tape, silicon memory (e.g., removable, non-removable, volatile or non-volatile), packetized or non-packetized wireline or wireless transmission signals.

Figure 5:
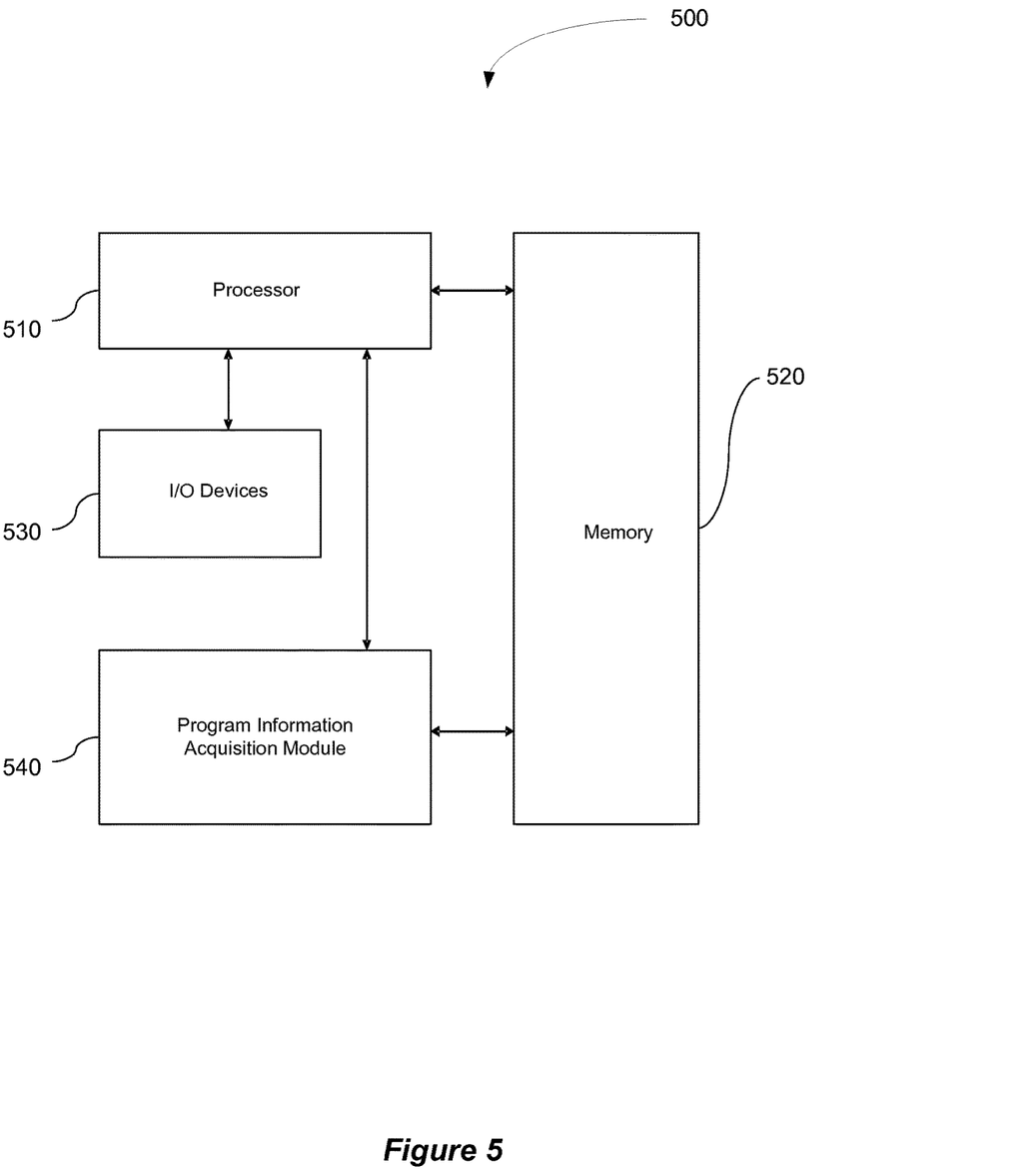
FIG. 5 illustrates a block diagram of a station or system that provides program information acquisition.

FIG. 5 illustrates a block diagram of a station or system 500 that provides program information acquisition. In one embodiment, the station or system 500 is implemented using a general purpose computer or any other hardware equivalents. Thus, the station or system 500 comprises a processor 510, a memory 520, e.g., random access memory ("RAM") and/or read only memory (ROM), a program information acquisition module 540, and various input/output devices 530, (e.g., e.g., audio/video outputs and audio/video inputs, storage devices, including but not limited to, a tape drive, a floppy drive, a hard disk drive or a compact disk drive, a receiver, a transmitter, a speaker, a display, an image capturing sensor, e.g., those used in a digital still camera or digital video camera, a clock, an output port, a user input device (such as a keyboard, a keypad, a mouse, and the like, or a microphone for capturing speech commands). The program information acquisition module 540 may include one or more processors, and/or corresponding code.

It should be understood that the program information acquisition module 540 may be implemented as one or more physical devices that are coupled to the processor. Alternatively, the program information acquisition module 540 may be represented by one or more software applications (or even a combination of software and hardware, e.g., using application specific integrated circuits (ASIC)), where the software is loaded from a storage medium, (e.g., a magnetic or optical drive or diskette) and operated by the processor in the memory 520 of the computer. As such, the program information acquisition module 540 (including associated data structures) of the present disclosure may be stored on a computer readable medium, e.g., RAM memory, magnetic or optical drive or diskette and the like.

It is understood that the program information acquisition approach described herein may also be applied in other types of systems. Those skilled in the art will appreciate that the various adaptations and modifications of the embodiments of this method and apparatus may be configured without departing from the scope and spirit of the present method and system. Therefore, it is to be understood that, within the scope of the appended claims, the present method and apparatus may be practiced other than as specifically described herein.

We claim:

1. A method comprising:

receiving, by a peripheral user device, recorded content from a recording device of a user, the recorded content being previously provided through a transmission from a distribution system to the recording device and recorded by the recording device on a storage medium associated with the recording device;

receiving, by the peripheral user device from the recording device, transmission data indicative of the previous transmission of the recorded content from the distribution system to the recording device, wherein the transmission data comprises one or more transmission identifiers that identify and are specific to the previous transmission of the recorded content from the distribution system to the recording device;

sending, by the peripheral user device to a server, a request for program data associated with the recorded content, wherein the request comprises the transmission data that is indicative of the previous transmission of the recorded content from the distribution system to the recording device; and responsive to the request, receiving, by the peripheral user device, the program data descriptive of the recorded content, wherein the program data identifies a title of the recorded content, wherein the program data is identified using the one or more transmission identifiers that identify and are specific to the previous transmission of the recorded content.

2. The method of claim 1, wherein the recorded content comprises video content or audio content.

3. The method of claim 1, wherein the recording device is a set top box.

4. The method of claim 1, further comprising displaying the program data in conjunction with the recorded content.

5. The method of claim 1, wherein the one or more transmission identifiers comprise a program identifier.

6. The method of claim 1, wherein the one or more transmission identifiers comprise a virtual channel map identifier.

7. The method of claim 1, wherein the one or more transmission identifiers comprise a source identifier.

8. The method of claim 1, wherein the one or more transmission identifiers comprise a source name.

9. The method of claim 1, wherein the one or more transmission identifiers comprise a time stamp.

10. A non-transitory computer readable medium comprising a computer readable program, wherein the computer readable program when executed on a client computer causes the client computer to:
- receive, by the client computer, recorded content from a recording device of a user, the recorded content being previously provided through a transmission from a distribution system to the recording device and recorded by the recording device on a storage medium associated with the recording device;
- receive, by the client computer from the recording device, transmission data indicative of the previous transmission of the recorded content from the distribution system to the recording device, wherein the transmission data comprises one or more transmission identifiers that identify and are specific to the previous transmission of the recorded content from the distribution system to the recording device;
- send, by the client computer to a server, a request for program data associated with the recorded content, wherein the request comprises the transmission data that is indicative of the previous transmission of the recorded content from the distribution system to the recording device; and
- responsive to the request, receive, by the client computer, the program data descriptive of the recorded content, wherein the program data identifies a title of the recorded content, wherein the program data is identified using the one or more transmission identifiers that identify and are specific to the previous transmission of the recorded content.

11. The non-transitory computer readable medium of claim 10, wherein the program data comprises a description of the recorded content.

12. The non-transitory computer readable medium of claim 10, wherein the one or more transmission identifiers comprise a program identifier.

13. The non-transitory computer readable medium of claim 10, wherein the one or more transmission identifiers comprise a virtual channel map identifier.

14. The method of claim 1, wherein the program data comprises a description of the recorded content.

15. The method of claim 1, wherein the transmission data is not directly assigned to the recorded content by a content owner/originator and not acquired from a third-party application.

16. The method of claim 1, wherein the one or more transmission identifiers are not related to another transmission from the distribution system to another recording device.

17. A peripheral user device comprising:
- a memory; and
- a processor, coupled to the memory, to:
  - receiving, by the peripheral user device, recorded content from a recording device of a user, the recorded content being previously provided through a transmission from a distribution system to the recording device and recorded by the recording device on a storage medium associated with the recording device;
  - receiving, by the peripheral user device from the recording device, transmission data indicative of the previous transmission of the recorded content from the distribution system to the recording device, wherein the transmission data comprises one or more transmission identifiers that identify and are specific to the previous transmission of the recorded content from the distribution system to the recording device;
  - sending, by the peripheral user device to a server, a request for program data associated with the recorded content, wherein the request comprises the transmission data that is indicative of the previous transmission of the recorded content from the distribution system to the recording device; and
  - responsive to the request, receiving, by the peripheral user device, the program data descriptive of the recorded content, wherein the program data identifies a title of the recorded content, wherein the program data is identified using the one or more transmission identifiers that identify and are specific to the previous transmission of the recorded content.

18. The peripheral user device of claim 17, wherein the recorded content comprises video content or audio content.

19. The peripheral user device of claim 17, the processor further to display the program data in conjunction with the recorded content.

20. The peripheral user device of claim 17, wherein the one or more transmission identifiers comprise a program identifier.

* * * * *